United States Patent
Ogata et al.

(10) Patent No.: US 7,732,099 B2
(45) Date of Patent: Jun. 8, 2010

(54) COMPOSITE POLYMER ELECTROLYTE COMPOSITION

(75) Inventors: Naoya Ogata, Tokyo (JP); Hiroshi Kagawa, Takatsuki (JP); Makiko Sada, Otsu (JP)

(73) Assignee: Trekion Co., Ltd., Otsu-Shi (JP)

( * ) Notice: Subject to any disclaimer, the term of this patent is extended or adjusted under 35 U.S.C. 154(b) by 508 days.

(21) Appl. No.: 10/551,330

(22) PCT Filed: Mar. 15, 2004

(86) PCT No.: PCT/JP2004/003447

§ 371 (c)(1),
(2), (4) Date: Sep. 29, 2005

(87) PCT Pub. No.: WO2004/088671

PCT Pub. Date: Oct. 14, 2004

(65) Prior Publication Data

US 2006/0057465 A1    Mar. 16, 2006

(30) Foreign Application Priority Data

Mar. 31, 2003 (JP) .............................. 2003-129589

(51) Int. Cl.
*H01M 10/40*    (2006.01)
(52) U.S. Cl. ....................... 429/307; 429/309; 429/310; 429/314
(58) Field of Classification Search .................. 429/307, 429/309, 310, 314
See application file for complete search history.

(56) References Cited

U.S. PATENT DOCUMENTS

| 6,426,863 | B1 * | 7/2002 | Munshi ...................... 361/503 |
| 6,759,170 | B2 * | 7/2004 | Gan et al. .................... 429/326 |
| 6,878,475 | B2 * | 4/2005 | Wixom et al. ........... 429/314 X |

FOREIGN PATENT DOCUMENTS

| JP | 10-83821 | * | 3/1998 |
| JP | 2003-22823 | * | 1/2003 |
| JP | 2003-77539 | * | 3/2003 |
| WO | WO 00/54351 | * | 9/2000 |

\* cited by examiner

*Primary Examiner*—Stephen J. Kalafut
(74) *Attorney, Agent, or Firm*—Millen, White, Zelano, Branigan, P.C.

(57) ABSTRACT

A totally solid polymer electrolyte composition with high ionic conductivity and enhanced mechanical properties is provided. This electrolyte composition is produced by polymerizing a monomer composition comprising a molten quaternary ammonium salt having a polymerizable functional group introduced therein and a charge transfer ion source in the presence of a polymeric reinforcing material. The polymeric reinforcing material can be formed into a composite of polymer blend morphology by dissolving the monomer composition and the reinforcing material in an appropriate organic solvent and polymerizing the solution. Alternatively, the composite can be obtained by impregnating a porous sheet or film as the reinforcing material with the monomer composition and effecting polymerization. An electrolyte for lithium ion battery can be obtained by selecting a lithium salt as the charge transfer ion source; an electrolyte for fuel cell by selecting a proton donor; and an electrolyte for dye sensitized solar cell by selecting a redox ion pair. A polymer electrolyte composition not containing the charge transfer ion source is also useful as an electrolyte for electrolytic capacitor.

14 Claims, No Drawings

COMPOSITE POLYMER ELECTROLYTE COMPOSITION

FIELD OF THE INVENTION

This invention relates to a composite polymer electrolyte composition to be disposed between a pair of electrodes of electrochemical devices such as lithium ion batteries, fuel cells, dye-sensitized solar cells or electrolytic capacitors.

BACKGROUND ART

Non-aqueous electrolyte solutions containing a lithium salt are generally used in lithium ion batteries. The non-aqueous electrolyte solution comprises an aprotic polar solvent and a lithium salt dissolved therein. Carbonates such as ethylene carbonate, propylene carbonate, dimethyl carbonate, diethyl carbonate or methyl ethyl carbonate; lactones such as γ-butyrolactone, or ethers such as tetrahydrofuran are examples of the solvent. These organic solvents are generally volatile and inflammable. Therefore, their use can develop safety concern when the battery is overly charged and discharged or short-circuited. Also liquid electrolyte solutions must encounter some difficulties when sealing the battery in liquid tight manner. The electrolyte solution may be solidified into a gel but problems of volatilization and inflammability of the organic solvent as well as leakage of liquid electrolyte separated from gel still remain unsolved.

Recently a lithium ion battery has been proposed which utilizes a non-aqueous electrolyte comprising a room-temperature molten quaternary ammonium salt and a lithium salt dissolved therein. See, JP-A-10/92467, JP-A-10/265674, JP-A-11/92467 and JP-A-2002/11230. The molten salt is liquid at room temperature which is safe by virtue of its non-volatility and non-inflammability. The molten salt electrolyte may be solidified with a suitable polymer into a gel. However, the resulting gel possesses poor mechanical properties and often suffers from phase separation into liquid. Thus problems remain unsolved with respect to handling of electrolyte and battery design utilizing such a molten salt electrolyte.

JP-A-10/83821 and JP-A-2000/11753 propose a total solid polymer electrolyte prepared by polymerizing an ion conductive molten salt monomer having a vinyl group introduced into an imidazolium salt. This polymer electrolyte does not possess a sufficient mechanical strength.

Accordingly, a need exists for a polymer electrolyte which is safe and having both high ion conductivity and satisfactory mechanical strength.

SUMMARY OF THE INVENTION

The above need may be met by providing a composite polymer electrolyte composition by the present invention. The inventive polymer electrolyte is produced by polymerizing a monomeric composition comprising a molten salt monomer consisting of a quaternary ammonium cation having a polymerizable functional group and a fluorine-containing anion, said monomeric composition further comprising a charge transfer ion source, wherein said polymerization is carried out in the presence of an electrochemically inert polymeric reinforcing material.

The charge transfer ion source is a lithium salt With a fluorine-containing anion or a protonized fluorine-containing anion depending on whether the intended use of the polymer electrolyte is for lithium ion batteries or fuel cells. When the electrolyte composition is intended to use in dye sensitized solar cells, the charge transfer ion source is a redox system represented by $I^-/I_3^-$ pair. The principle of the present invention may also be applied to the electrolyte for electrolytic capacitors. In which case the monomeric composition free of the charge transfer ion source is polymerized in the presence of the polymeric reinforcing material.

There are several methods for producing a composite comprising the molten salt polymer and the electrochemically inert polymeric reinforcing material such as polyvinilydene fluoride. The first method comprises the steps of dissolving the molten salt monomer containing the ion source and the polymer reinforcing material in a suitable solvent, casting the resulting solution into a film, and the polymerizing the film. The second method utilizes a polymer reinforcing material having introduced therein a plurality of crosslinkable functional groups such as carbon-to-carbon double bonds. The second method is otherwise identical to the first method. The third method utilizes a porous sheet or film of the polymer reinforcing material. The porous sheet is impregnated with a solution of the molten salt monomer followed by polymerizing the monomer in situ. The polymerization may be carried out by means of heat, light (UV light) or electron beam irradiation.

The polymer electrolyte may be formed into a discrete film by casting a solution containing the molten salt monomer onto a non-adhesive substrate such as glass or polyester to form a film, polymerizing the film and then stripping from the substrate. Alternatively, the monomer solution may be applied on the active substance layer of an electrode and polymerizing the monomer in situ to produce a polymer electrolyte film integrally formed with the electrode.

The polymer electrolyte film produced by the present invention exhibits remarkably enhanced mechanical properties such as tensile strength compared to the corresponding polymer electrolyte film not containing the polymeric reinforcing material. The mechanical properties may be further enhanced by copolymerizing the molten salt monomer with a small proportion of a polyfunctional monomer. As a result of reinforcement, the composite polymer electrolyte composition of the present invention enables a compact battery having a high energy density to be fabricated.

PREFERRED EMBODIMENT OF THE INVENTION

The quaternary ammonium salt having a polymerizable functional group may consist of an aliphatic, alicyclic, aromatic or heterocyclic ammonium cation and a fluorine-containing anion. The term "quaternary ammonium cation" refer's to a nitrogen onium ion and includes a heterocyclic onium cation such as imdazolium or pyridinium cation.

Examples of said ammonium cations include pyrrolium cation, pyridinium cation, imidazolium cation, pyrazolium cation, benzimidazolium cation, indolium cation, carbazolium cation, quinolinium cation, pyrrolidinium cation, piperidinium cation, piperazinium cation and alkylammonium cations having a $C_1$-$C_{30}$ hydrocarbon radical optionally substituted by hydroxyalkyl or alkoxyalkyl group. Also included are derivatives of the above onium cations having a $C_1$-$C_{10}$ hydrocarbon residue or hydroxyalkyl or alkoxyalkyl group attached to the nitrogen atom and/or ring carbon atoms.

Examples of anions include $BF_4^-$, $PF_6^-$, $CnF_{2n+1}CO_2^-$, $C_nF_{2n+1}SO_3^-$ wherein n is 1 to 4, $(FSO_2)_2N^-$, $(CF_3SO_2)_2N^-$, $(C_2F_5SO_2)_2N^-$, $(CF_3SO_2)_3C^-$, $CF_3SO_2$—N—$COCF_3$, R—$SO_2$—N—$SO_2CF_3$ wherein R is an aliphatic radical and $ArSO_2$—N—$SO_2CF_3$ wherein Ar is an aromatic radical.

The above cations and anions are highly resistant to heat, reduction or oxidation and allow to take a wide electrochemical window suitable for batteries or capacitors.

Examples of polymerizable functional groups to be introduced into the molten salt monomer include carbon-to-carbon unsaturated group such as vinyl, acryl, methacryl or allyl; cyclic alkoxide groups such as epoxy or oxetane; and other functional groups such as isocyanate; hydroxyl or carboxyl group.

Examples of particularly preferred ammonium cations include 1-vinyl-3-alkylimidazolium cation, 1-alkyl-3-allylimidazolium cation, 1-(4-vinylbenzyl)-3-alkylimidazolium cation, 1-vinyloxyethyl-3-alkylimidazolium cation, 1-vinylimidazolium cation, 1-allylimidazolium cation, N-allyl-benzimidazolium cation and diallyl dialkylammonium cation. The alkyl may contain 1 to 10 carbon atoms.

Examples of particularly preferred anions include bis[(trifluoromethyl)sulfonyl]imide anion, 2,2,2-trifluoro-N-(trifluoromethylsulfonyl)acetamide anion, bis[(fluoro)sulfonyl]imide anion, tetrafluoroborate anion, and trifluoromethanesulfonate anion.

Examples of particularly preferred monomers include 1-vinyl-3-alkylimidazolium bis[(trifluoromethyl)sulfonyl]imide, 1-vinyl-3-alkylimidazolium tetrafluoroborate, 4-vinyl-4-alkylpyridinium bis[(trifluoromethyl)sulfonyl]imide, 1-(4-vinylbenzyl)-3-alkylimidazolium bis[(trifluoromethyl)sulfo-nyl]imide, 1-(4-vinylbenzyl)-3-alkylimidazolium tetrafluoroborate, 1-glycidyl-3-alkylimidazolium bis[(trifluoromethyl)sulfonyl]imide, 1-glycidyl-3-alkylimidazolium tetrafluoroborate, and N-vinylcarbazolium tetrafluoroborate. All alkyls therein contain 1 to 10 carbon atoms.

The charge transfer ion source for lithium ion batteries is a lithium salt. Preferably lithium salts with a fluorine-containing anion may be used in the present invention. Specific examples thereof include $LiBF_4$, $LiPF_6$, $C_nF_{2n+1}CO_2Li$, $C_nF_{2n+1}SO_3Li$ wherein n is 1 to 4, $(FSO_2)_2NLi$, $(CF_3SO_2)_2NLi$, $(C_2F_5SO_2)_2NLi$, $(CF_3SO_2)_3CLi$, $Li(CF_3SO_2-N-COCF_3)$, $Li(R-SO_2-N-SO_2CF_3)$ wherein R is an aliphatic group, and $Li(ArSO_2-N-SO_2CF_3)$ wherein Ar is an aromatic group.

The charge transfer ion source (proton source) of fuel cells may be selected from the anion species forming the molten salt monomer as described above.

The charge transfer ion source for dye sensitized solar cells is typically $I^-/I_3^-$ redox pair and includes other pairs such as $Br^-/Br_3^-$ pair and quinone/hydroquinone pair.

The polymer reinforcing material is required to be excellent in various properties. These include electrochemical/chemical stabilities such as redox resistance, solvent resistance, low water absorption and flame retardancy; thermal properties such as heat resistant and low temperature resistance; mechanical properties such as stretchability and flexibility; and processability. Examples thereof include fluorocarbon polymers such as polytetrafluoroethylene and polyvinylidene fluoride; polyolefins such as polyethylene and polypropylene; vinyl polymers such as polyacrylonitrile and polystyrene; polysulfone polymers such as polysulfone and polyether sulfone; polyether ketone polymers; and polyimide polymers such as polyether imide, polyamide imide and polyimide; and copolymers of these polymers.

The polymer reinforcing material is preferably a fluorocarbon polymer and most preferably poly-vinylidene fluoride, a copolymer or modified polymer thereof. The number average molecular weight thereof ranges between 2,000 and 2,000,000, preferably between 3,000 and 100,000, most preferably between 5,000 and 50,000.

Now the method of producing the polymer electrolyte composition of the present invention will be described in detail taking the electrolyte composition to be used in lithium ion batteries as an example. It will be easily appreciated by those skilled in the art that the disclosed method is applicable to the production of similar electrolyte compositions for use in fuel cells or dye sensitized solar cells as well by changing the charge transfer ion source to another one.

As already described, a porous sheet or film of the polymer reinforcing material may be impregnated with a molten salt monomer containing a lithium salt followed by subjection the monomer to polymerization in situ. This method may be modified by dispersing fibrous polymer reinforcing material in the molten salt monomer containing a lithium salt and then subjecting the suspension to polymerization.

Specific examples of porous materials include woven or nonwoven fabric and porous sheets or films having a thickness from 5 to 100 μm, preferably from 10 to 50 μm. The nonwoven fabric preferably has an air permeability according to JIS 1096 of 5 to 40 cc/$m^2$.sec. The porous sheet has a pore size preferably from 0.05 to 1 μm and more preferably from 0.05 to 0.5 μm and a porosity from 20 to 80%, preferably from 35 to 60%. These reinforcing materials may be prepared by any known method using existing equipment or may be obtained as commercial products.

Films of the composite polymer electrolyte composition may be fabricated by the step of dissolving a molten salt monomer, a lithium salt and a polymer reinforcing material in a suitable solvent such as dimethylacetamide, casting or applying the resulting solution onto a substrate such as glass plate or polyester film, subjecting the solution to polymerization, and stripping the polymer electrolyte film. Depending on the nature of polymer, the reinforcing material would be molten together with the molten salt monomer in the absence of solvent.

When the electrolyte composition is a polymer blend of the polymer of molten salt monomer and the reinforcing polymer, the proportion of the reinforcing polymer is adjusted to optimize the balance between the mechanical properties and the ion conductivity of the electrode. The weight ratio of the reinforcing material to the molten salt monomer generally lies between 0.1 and 0.8, preferably between 0.35 and 0.65. The optimum balance for particular combinations of the molten salt monomer and the reinforcing material may easily be determined empirically. The optimum balance is not needed for polymer electrolyte compositions reinforced with a porous polymer sheet or film because the polymer electrolyte containing a lithium salt forms a continuous phase.

The optimum balance between the ion conductivity and the mechanical properties of the blend type polymer electrolyte composition also depends on the weight ratio of lithium salt to the molten salt monomer. This ratio generally ranges between 0.05 and 0.8, preferably between 0.1 and 0.7, most preferably 0.15 and 0.5. The optimum balance for particular combinations of the molten salt monomer and the lithium salt may easily be determined empirically. When porous sheet or film of reinforcing material is used, the ratio of lithium salt to the molten salt monomer is adjusted to maximize the ion conductivity.

The molten salt monomer may be polymerized alone or with a copolymerizable comonomer. In a preferred embodiment, the molten salt monomer is grafted to the reinforcing material having a functional group that reacts with the molten salt monomer. Two or more different molten salt monomers or monomers other than quaternary salt type or polyfunctional monomers having plural polymerizable groups may be used in copolymerization.

The polymerization reaction may be conducted usually at a temperature from 40° C. to 200° C. in the presence of a polymerization initiator or a hardening agent. Examples of initiators for radical polymerization of carbon-to-carbon unsaturated monomers include peroxide initiators such as benzoyl peroxide, dicumyl peroxide, di-t-butyl oxide, 1,1-bis (t-butylperoxy)cyclohexane or cumene hydroperoxide; azo-bis compounds such as 2,2'-azobisisobutyronitrile or 2,2'-azobis(2,4-dimethylvaleronitrile); and inorganic initiators such as ammonium persulfate. The amount of initiator is normally 0.1-10% and preferably 1-5% by weight of the monomer.

When the polymerizable group is epoxide group, amines, acid anhydrides or carboxylic acid may be used as a hardening agent. Alkylimidazole derivatives may be used to catalyze the hardening reaction.

The polymerization may be conducted by the irradiation with UV ray in the presence of a photoinitiator or electron beam. In a preferred embodiment, the polymerization is conducted by means of electron beam since occurrence of cross-linking of reinforcing material per se or graft reaction of the monomer with the reinforcing material is expected. The dose of electron beam ranges from 0.1 to 50 Mrad, preferably from 1 to 20 Mrad.

Examples of polyfunctional monomers having two or more functional groups which are polymerizable with the molten salt monomer includes divinylbenzene, diallyl phthalate, ethyleneglycol di(meth)acrylate, triethyleneglycol di(meth)acrylate, trimethylolpropane tri(meth)acrylate, pentaerythritol tetra(meth)acrylate, triallylcyanurate, triallylisocyanurate, diallyldimethylammonium bis[(trifluoromethyl)sulfonyl]imide, diallyldimethylammonium tetrafluoroborate and 2,2-bis(glycidyloxyphenyl)propane. The polyfunctional monomers may be copolymerized in an amount from 0.5 to 10 mol % relative to the molten salt monomer.

The polymer electrolyte composition of the present invention forming a polymer blend undergoes microphase separation into the molten salt polymer phase containing the charge transfer ion source and the reinforcing polymer phase, the separated phase carrying ion conductivity and reinforcing effect, respectively. In case of the composite electrolyte composition comprising a porous reinforcing material, it is the continuous phase of molten salt polymer that carries the ion conductivity of the electrolyte.

The composite polymer electrolyte composition of the present invention may be sandwiched between the opposing pair of electrodes in an electrochemical device such as lithium ion batteries, fuel cells, dye-sensitized solar cells or electrolytic capacitors. The electrodes used for respective devices are well known in the art.

The electrode pair for use in lithium ion batteries comprises an anode having an active substance layer comprised of a carbonaceous material capable of absorption and desorption of lithium ions typically graphite and a cathode having an active sub-stance layer comprised of a metal oxide complex containing lithium capable of absorption and desorption of lithium ions such as $LiCoO_2$, $LiFeO$, $LiNi_nCo_{1-n}$ or $LiMn_2O_4$. When the anodic active substance is lithium metal or a lithium alloy, the cathodic active substance may be a metal oxide or sulfide free from lithium such as $MnO_2$, $TiS_2$, $MoS_2$, $MoO_3$ or $V_2O_5$.

Fuel cells generally utilize a porous electrode including a catalyst such as Pt. Dye sensitized solar cells utilize a semiconductor electrode containing a sensitizing dye adsorbed on the semiconductor layer. The counter electrode is a conductor electrode represented by a Pt vapor deposited glass plate. Electrolytic capacitors utilize conventional electrode pairs for liquid type electrolytic capacitors.

EXAMPLES

The following examples are given to illustrate the present invention without limiting the invention thereto. Although the examples are directed to the production of polymer electrolyte compositions for lithium ion batteries, those skilled in the art can easily modify the examples by changing the charge transfer ion source to adapt the electrolyte for use in other electrochemical devices.

All parts and percents therein are by weight unless otherwise indicated.

The measurement of ion conductivity and tensile strength of the electrolyte was carried out according to the methods below.

Ion Conductivity:

A test specimen was sandwiched between a pair of Pt electrodes having an effective surface area of 0.95 $cm^2$, then the film resistivity was determined by the AC impedance method at room temperature, 65% RH, 0.1 V and frequency range of 1 Hz-10 MHz. The ion conductivity was calculated from the measured resistivity.

Tensile Strength:

A tensile tester sold under the name of TENSILON RT1350 by A & D Co., Ltd. was used at 23° C. and at a rate of 5 cm/min.

All chemical compounds synthesized in Examples were identified by means of IR spectrometry and NMR.

Example 1

Synthesis of 1-methyl-3-(4-vinylbenzyl) imidazolium bis[(trifluoromethyl)sulfonyl]imide (MVBI.TFSI)

To a solution of 37.0 g (0.45 mol) of 1-methylimidazol in 200 ml of 1,1,1-trichloroethane was added dropwise a solution of 68.7 g (0.45 mol) of p-chloromethylstyrene in 100 ml of 1,1,1-trichloroethane at room temperature while stirring. After the addition, the mixture was stirred at 65° C. for 10 hours. The resulting product was separated from the reaction mixture, washed with 100 ml of 1,1,1--trichloroethane twice, and dried at 65° C. at 0.1 mmHg for two hours to give 1-methyl-3-(4-vinylbenzyl)imidazolium chloride (MVBI.Cl) as a pale yellow solid. Yield was 52.8 g (50%).

31.9 g (0.1 mol) of potassium bis[(trifluoromethyl)sulfonyl]imide was dissolved in 100 ml of water at 70° C. To this solution was added dropwise with stirring an aqueous solution of 23.4 g (0.1 mol) of MVBI.Cl in 50 ml of water at 50° C. over 15 minutes. After the addition, the mixture was vigorously stirred for 2 hours. The resulting oily layer was separated from the aqueous phase, washed with 50 ml of water twice and dried at 60° C. at 0.1 mmHg for 2 hours. 40.8 g (85%) of 1-methyl-3-(4-vinylbenzyl)imidazolium bis[(trifluromethyl)sulfonyl]imide (MVBI.TFSI) was obtained.

Example 2

Synthesis of Modified Polyvinylidene Fluoride Polymer Having Carbon-to-Carbon Unsaturations (DBF)

A 300 ml three necked flask equipped with a stirrer was charged with 85 g of N-methyl-2-pyrrolidone (NMP). To the flask was added 15 g of polyvinylidene fluoride (PVDF) sold by Atofina under the name of Kynar 461 to dissolve in NMP at 90° C. Then 2.37 g of triethylamine was added dropwise to the solution of PVDF with stirring at 90° C. requiring about 10 minutes. Stirring was continued for additional 30 minutes. After cooling the reaction mixture was poured into 300 ml of water with stirring to precipitate the polymer. After washing with 500 ml of water twice, the precipitated polymer was dried at 60° C. under vacuum for 10 hours. The NMR analysis showed that about 8 mol % of carbon-to-carbon double bond was introduced to the polymer.

Example 3

8.4 g of 1-methyl-3-(4-vinylbenzyl)imidazolium bis[(trifluoromethyl)sulfonyl]imide (MVBI.TFSI) prepared in Example 1, 10.0 g of modified polyvinylidene fluoride (DBF) prepared in Example 2, 0.17 g of benzoylperoxide and 4.0 g of lithium bis[(trifluoromethyl)sulfonyl]imide were dissolved in 80 g of dimethylacetamide to prepare a precursor solution. A polymer electrolyte film having a thickness of 25 μm was prepared by applying the precursor solution onto a polyester film (Toray type T) and drying and polymerizing the precursor solution for 30 min. in a hot air dryer. After stripping from the substrate film, a transparent electrolyte film having a thickness of 25 μm, an ion conductivity of $2.1 \times 10^{-3}$ S/cm at 20° C., and a tensile strength of 11 MPa was obtained.

Example 4

Analogous to Example 1, triethyl(4-vinylbenzyl)ammonium chloride was synthesized from triethylamine and p-chloromethylstyrene. This quaternary ammonium salt was reacted with potassium TFSI to syntesize triethyl-(4-vinylbenzyl)ammonium bis[(trifluoromethyl)sulfonyl]imide (TEVBA.TFSI).

Then 7.0 g of TEVBA.TFSI, 13.0 g of PVDF (Kynar 461, Atofina), 0.14 g of benzoyl peroxide and 7.0 g of LiTFSI were dissolved in 80 g of dimethylacetamide to prepare an electrolyte precursor solution. This solution was applied on a 3 mm glass plate and heated at 130° C. for 30 minutes to polymerize and dry the solution. After stripping from the glass plate, an electrolyte film having a thickness of 30 μm, an ion conductivity of $3.0 \times 10^{-4}$ S/cm and a tensile strength of 6 MPa was obtained.

Example 5

Preparation of Porous PVDF Film 50 g of PVDF (#1700, Kureha Chemical) and 50 g of polyethylene glycol 1000 were dissolved in 450 g of dimethylacetamide. This solution was cast on a 3 mm glass plate, dried in a hot air dryer at 150° C. for 10 minutes. After cooling the dried polymer blend film was soaked in a water bath at room temperature for 30 minutes to leach out polyethylene glycol. This process was repeated twice using fresh water. After drying at 100° C. for 30 minutes, a porous PVDF film having a thickness of 25 μm, a porosity of 59% and an average pore size of 5 μm (determined by scanning electron microscope) was produced.

Example 6

Analogous to Example 1, 1-vinyl-3-ethylimidazolium bromide (EVI.Br) was synthesized by reacting ethyl bromide with 1-vinylimidazole. EVI.Br thus synthesized was reacted with potassim bis[(trifluoromethyl)sulfonyl]imide (KTFS) to produce EVI.TFSI.

Then the porous PVDF film produced in Example 5 was impregnated with a solution containing 42 g of EVI.TFSI, 15 g of LiTFSI and 0.8 g of benzoyl peroxide under vacuum. Percent impregnation calculated according to the following equation was 57%.

$$\% \text{ Impregnation} = \frac{W_2 - W_1}{W_2} \times 100$$

wherein $W_2$ is the weight of film after impregnation and $W_1$ is the weight of film before impregnation.

The theoretical percent impregnation calculated from the porocity of film and the density of electrolyte precursor solution was 55%.

A composite electrolyte film was produced by heating the impregnated film at 130° C. for 30 minutes. The ion conductivity and tensile strength thereof are $6.5 \times 10^{-4}$ S/cm and 12 MPa, respectively.

Example 7

Lithium Ion Battery

Polymer electrolyte precursor solution:

Analogous to Example 1, 1-allyl-3-methylimidazolium bromide (AMIBr) produced by the reaction of allylbromide with 1-methylimidazole was reacted with potassium bis[(trifluoromethyl)sulfonyl]imide (KTFSI) to produce AMI TFSI. Similarly, diallyldimethylammonium bis[(trifluoromethyl) sulfonyl]imide (DAA.TFSI) was synthesized from diallyldimethylammonium bromide (DAABr) and KTFSI.

2.4 g of AMI.TFSI, 2.4 g of DAA.TFSI, 2.0 g of LiTFSI, 0.24 g of benzoyl peroxide and 5.0 g PVDF (Kynar 461, Atofina) were dissolved in 95 g of N-methyl-2-pyrrolidone.

Cathode:

A cathodic active substance layer was formed on aluminum collector foil by applying a paste comprising a mixture of $LiCoO_2$ and acetylene black in the above electrolyte precursor solution. Thereafter the applied paste layer was dried at 130° C. for 10 minutes and then compressed to a thickness of 90 μm.

Anode:

An anodic active substance layer was formed on copper collector foil by applying a paste comprising a mixture of natural graphite and conductor carbon black in the above electrolyte precursor solution. Thereafter the applied paste layer was dried at 130° C. for 10 minutes and then compressed to a thickness of 90 μm.

Electrode-Electrolyte Assembly:

The polymer electrolyte precursor solution prepared above was cast on a 100 μm polyester film (T type, Toray), dried at 130° C. for 30 minutes to form a composite polymer electrolyte film having a thickness of 30 μm on the polyester film.

The electrolyte film thus prepared was overlaid on the cathode as prepared above with the electrolyte film facing the active substance layer. The assemblage was passed through a nip between a pair of rolls heated to 130° C. to laminate the polymer electrolyte film with the cathode. After stripping off the polyester film, the laminate was overlaid, in turn, on the anode as prepared above with the electrolyte layer facing the anodic active substance layer. The assemblage was passed through a nip between a pair of hot rolls heated to 130° C. and compacted in a hot press at 150° C. at a pressure/of 10 kg/cm$^2$ for 30 minutes.

The resulting laminate comprised of layers of cathode, electrolyte and anodes was punched into a number of disc of 15 mm diameter. A coin shaped cell was assembled by placing the disc in a container together with a spring member and closing the container with a lid member under pressure, all being made of aluminum.

The finished coin cell was tested for charge-discharge cycling performance under the following conditions. The cell was charged at a constant current of 1 mA until a voltage of 4.0V was reached and discharged at a constant current of 4.0 V until the voltage decreased to 2.5V. The performance was evaluated in terms of % retention of the nominal discharge capacity as designed. The discharge capacity was 95% at the initial cycle and 85% at the 20th cycle, respectively.

The invention claimed is:

1. A composite polymer electrolyte composition comprising a product produced by polymerizing in situ a monomer composition comprising (a) molten salt monomer having a polymerizable functional group and a quaternary ammonium salt structure consisting of a quaternary ammonium cation and a fluorine-containing anion, and (b) charge transfer ion source comprising a lithium salt of a lithium ion and a fluorine-containing anion,
   in the presence of an electrochemically inert polymer reinforcing material selected from the group consisting of polyvinylidene fluoride and a copolymer thereof.

2. The composite polymer electrolyte composition of claim 1 wherein said monomer composition further comprising a polyfunctional monomer copolymerizable with said molten salt monomer.

3. The composition of claim 1 wherein said quaternary ammonium cation is selected from the group consisting of 1-vinyl-3-alkylimidazolium cation, 4-vinyl-1-alkylpyridinium cation, 1-alkyl-3-allylimidazolium cation, 1-(4-vinylbenzyl-3-alkylimidazolium cation, 1-(vinyloxyethyl)-3-alkylimidazolium cation, N-vinylimidazolium cation, 1-allylimidazolium cation, N-allylbenzimidazolium cation and quaternary diallyldialkylammonium cation, and wherein said fluorine-containing anion is selected from the group consisting of bis[trifluoromethyl)sulfonyl]imide anion, 2,2,2-trifluoro-N-(trifluoromethylsulfonyl) acetamide anion, bis[(pentafluoroethyl) sulfonyl]imide anion, bis(fluorosulfonyl)imide anion, tetrafluoroborate anion and trifluoromethanesulfonate anion.

4. The composite polymer electrolyte composition of claim 1 wherein said polymer reinforcing material is polyvinylidene fluoride or a modified polyvinylidene fluoride containing a plurality of carbon-to-carbon double bonds.

5. The composite polymer electrolyte composition of claim 1 wherein said polymer reinforcing material is a porous sheet or film containing a large number of continuous pores, and wherein the polymer of said molten salt monomer forms a continuous phase through said pores.

6. The composite polymer electrolyte composition of claim 1 wherein said monomer composition is polymerized by heat.

7. The composite polymer electrolyte composition of claim 1 wherein said monomer composition is polymerized by irradiating with UV radiation.

8. The composite polymer electrolyte composition of claim 1 wherein said monomer composition is polymerized by irradiating with electron beam.

9. A composite polymer electrolyte composition of claim 1 wherein said charge transfer ion source is selected from the group consisting of $LiBF_4$, $LiPF_6$, $C_nF_{2n+1}CO_2Li$, $CnF_{2n+1}O_3Li$, $(FSO_2)_2NLi$, $(CF_3SO_2)_2NLi$, $(C_2F_5SO_2)_2NLi$, $(CF_3SO_3)_3CLi$, $(CF_3SO_2-N-COCF_3)Li$ and $(RSO_2-N-SO_2CF_3)Li$, wherein n is an integer of 1-4 and R is an alkyl or aryl group.

10. A lithium ion battery comprising the composite polymer electrolyte composition of claim 9 sandwiched between an anode and a cathode.

11. A composite polymer electrolyte composition comprising a polymer blend of (a) a polymerization product of a monomer having a polymerizable functional group and a quaternary ammonium salt structure consisting of a quaternary ammonium cation and a fluorine-containing anion, and (b) an electrochemically inert polymer selected from the group consisting of polyvinylidene fluoride and a copolymer thereof, said composite polymer electrolyte composition further comprising a charge transfer ion source comprising a lithium salt of a lithium ion and a fluorine-containing anion.

12. The composite polymer electrolyte composition of claim 11 wherein said ammonium cation is selected from the group consisting of 1-vinyl-3-alkylimidazorium cation, 4-vinyl-1-alkylpyridinium cation, 1-alkyl-3-allylimidazolium cation, 1-(4-vinylbenzyl)-3-alkylimidazorium cation, 1-(vinyloxyethyl)-3-alkylimidazorium cation, 1-vinylimidazorium cation, 1-allylimidazorium cation, N-allylbenzimidazolium cation and quaternary diallyldialkyl ammonium cation, and wherein said fluorine-containing anion is selected from the group consisting of bis[(trifluoromethyl) sulfonylimide anion, 2,2,2-trifluoro-N-(trifluoromethylsulfonyl) acetamide anion, bis[{pentafluoroethyl)sulfonyl]imide anion, bis(fluorosulfonyl)imide anion, tetrafluoroborate anion and trifluoromethanesulfonate anion.

13. The composite polymer electrolyte composition of claim 11 wherein said charge transfer ion source is selected from the group consisting of of $LiBF_4$, $LiBF_6$, $C_nF_{2n+1}Li$, $C_nF_{2n+1}SO_3Li$, $(FSO_2)_2NLi$, $(CF_3SO_2)_2NLi$, $(C_2F_5SO_2)_2NLi$, $(CF_3SO_2)Cli$, $(CF_3-SO_2-N-COCF_3)Li$ and $(R-SO_2-N-SO_2CF_3)Li$, wherein n is an integer of 1-4 and R is an alkyl.

14. A lithium ion battery comprising the composite polymer electrolyte composition of claim 13 sandwiched between an anode and a cathode.

* * * * *

UNITED STATES PATENT AND TRADEMARK OFFICE
CERTIFICATE OF CORRECTION

PATENT NO. : 7,732,099 B2
APPLICATION NO. : 10/551330
DATED : June 8, 2010
INVENTOR(S) : Ogata et al.

It is certified that error appears in the above-identified patent and that said Letters Patent is hereby corrected as shown below:

Column 10, line 14 reads "$O_3Li$, $(FSO_2)_2NLi$, $(CF_3SO_2)_2NLi$, $(C_2F_5SO_2)_2NLi$," should read
-- $SO_3Li$, $(FSO_2)_2NLi$, $(CF_3SO_2)_2NLi$, $(C_2F_5SO_2)_2NLi$, --

Signed and Sealed this

Tenth Day of August, 2010

David J. Kappos
*Director of the United States Patent and Trademark Office*